United States Patent
Umemoto et al.

(10) Patent No.: US 6,710,840 B2
(45) Date of Patent: Mar. 23, 2004

(54) CELL SUBSTRATE AND LIQUID CRYSTAL DISPLAY DEVICE IN WHICH A RESIN PLATE HAS A CONDUCTIVE LAYER VIA A TRANSPARENT LAYER WITH A LOWER REFRACTIVE INDEX THAN THE RESIN PLATE

(75) Inventors: Seiji Umemoto, Osaka (JP); Yoshimasa Sakata, Osaka (JP); Kiichi Shimodaira, Osaka (JP); Nobuyoshi Yagi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/883,941

(22) Filed: Jun. 20, 2001

(65) Prior Publication Data
US 2002/0018864 A1 Feb. 14, 2002

(30) Foreign Application Priority Data
Jun. 21, 2000 (JP) ..................................... P.2000-185977

(51) Int. Cl.⁷ ....................... G02F 1/1333; C09K 19/00; B32B 7/02
(52) U.S. Cl. .......................... 349/158; 349/61; 349/122; 428/1.62; 428/212
(58) Field of Search ............................... 349/122, 158, 349/61, 63; 428/1.62, 212

(56) References Cited

U.S. PATENT DOCUMENTS

| 5,614,287 | A  | * | 3/1997  | Sekiya et al. ................ 428/163 |
| 5,645,901 | A  |   | 7/1997  | Fukuchi et al. |
| 6,033,743 | A  | * | 3/2000  | Suzuki et al. ............... 428/1.31 |
| 6,480,250 | B1 | * | 11/2002 | Matsufuji et al. ............ 349/113 |
| 2002/0005922 | A1 | * | 1/2002 | Umemoto et al. ............. 349/65 |
| 2002/0018163 | A1 | * | 2/2002 | Yamamoto et al. .......... 349/122 |

FOREIGN PATENT DOCUMENTS

| JP | 05-134102 | * | 5/1993 |          |
| JP | 5-158033  |   | 6/1993 | ......... G02F/1/1335 |
| JP | 6-222352  |   | 8/1994 |          |
| JP | 08-240800 | * | 9/1996 |          |

* cited by examiner

*Primary Examiner*—Tarifur R. Chowdhury
(74) *Attorney, Agent, or Firm*—Sughrue Mion, PLLC (57) ABSTRACT

A liquid crystal display device having a resin substrate wherein a transparent resin plate has at least a conductive layer via a transparent layer with a lower refractive index than the resin plate, and a liquid crystal display panel including at least a liquid crystal cell with a liquid crystal carried between a visible side substrate and a back side substrate that are disposed with electrodes on their substrates opposed to one another. One or both of the visible side substrate and the back side substrate is or are the resin substrate.

9 Claims, 3 Drawing Sheets

CELL SUBSTRATE AND LIQUID CRYSTAL DISPLAY DEVICE IN WHICH A RESIN PLATE HAS A CONDUCTIVE LAYER VIA A TRANSPARENT LAYER WITH A LOWER REFRACTIVE INDEX THAN THE RESIN PLATE

BACKGROUND OF THE INVENTION

1. Field of the Invention

The present invention relates to a resin substrate capable of transmitting an incident light from the lateral face backwards efficiently, and a liquid crystal display device of transmission type or transmission/reflection type that is superior in the display quality, employing the resin substrate as a cell substrate.

The present application is based on Japanese Patent Application No. 2000-185977, which is incorporated herein by reference.

2. Description of the Related Art

Figure 5:
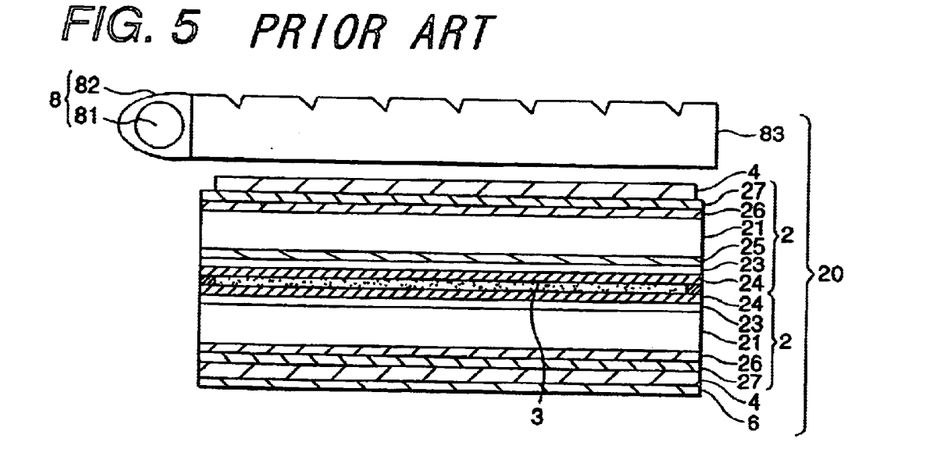
FIG. 5 is a cross-sectional view of the conventional Example.
Figure 6:
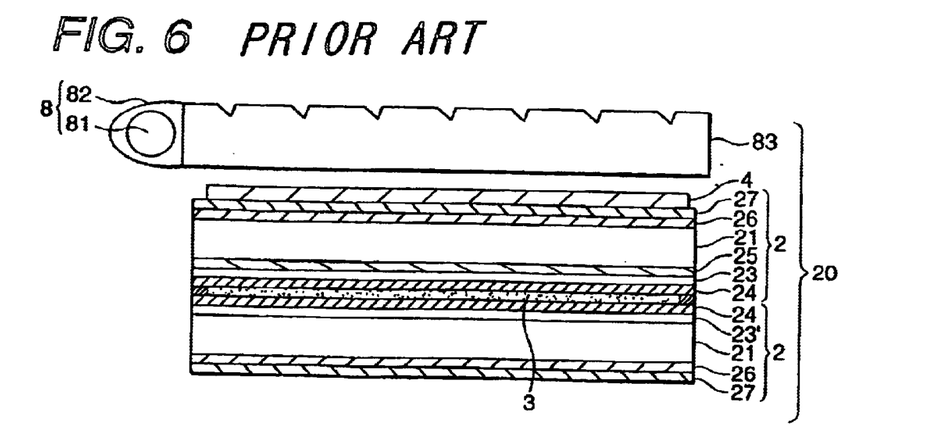
FIG. 6 is a cross-sectional view of another conventional example.
Figure 7:
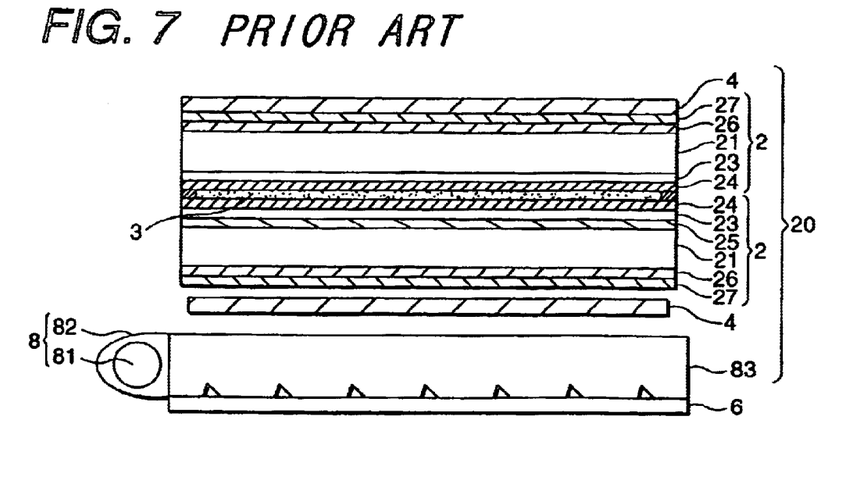
FIG. 7 is a cross-sectional view of a further conventional example.

Nowadays, a liquid crystal display device is made smaller in thickness and weight for the purposes of suppressing the increased weight along with the larger size of a TV or personal computer screen, or reducing the size or weight of a portable personal computer or portable telephone. As illustrated in FIGS. 5 to 7, a conventional sidelight type light conducting plate 83 with a front light 8 or a back light 8 is difficult to reduce in thickness and weight. By the way, the side-light type light conducting plate may have a thickness of 1 mm or more due to the necessity of light transmission, and usually have a thickness of 3 mm or more when a light diffusion plate, a reflector or a prism sheet is disposed thereon. Reference numeral 81 denotes a light source and reference numeral 82 denotes a light source holder.

In view of the above, a liquid crystal display device of reflection type has been proposed (Unexamined Japanese Patent Publication No. Hei. 5-158033) in which a lighting device is disposed on the lateral face of a liquid crystal display panel, an illuminating light from its lateral face is transmitted all over the panel, while being totally reflected at a cell substrate on the visible side, its reflected light being scattered with a reflector of rough face type and used for the display. This is aimed at employing the liquid crystal panel also as a light conducting plate of the side-light type, and omitting the conducting plate for accomplishment of the liquid crystal display device of thin and light weight structure. Note that the transmission of light is carried by the entire liquid crystal display panel, principally the cell substrate of the liquid crystal cell.

In the previously noted patent publication, a glass plate is proposed as the cell substrate, but the present inventors attempted to use a resin substrate to further reduce the weight. However, it was found that there was the problem with the conventional resin substrate, satisfying the required characteristics such as transparency, thermal resistance, chemical resistance, surface smoothness, and gas barrier property, that the light transmission efficiency was lower, and the display was darker as being farther away from the lighting device, with great differences in brightness on the panel face.

SUMMARY OF THE INVENTION

It is an object of the present invention to provide a liquid crystal display device of the transmission type or transmission/reflection type that is superior in the luminance and uniformity and has an excellent display quality by producing a resin substrate that is superior in the backward transmission efficiency of a light that is incident upon the lateral face, while utilizing the advantages of thin type and light weight structure.

This invention provides a liquid crystal display device having a resin substrate wherein a transparent resin plate has at least a conductive layer via a transparent layer with a lower refractive index than the resin plate, and a liquid crystal display panel comprising at least a liquid crystal cell with a liquid crystal carried between a visible side substrate and a back side substrate that are disposed with electrodes on their substrates opposed to one another, wherein one or both of the visible side substrate and the back side substrate is or are the resin substrate.

With the resin substrate of the invention, the transparent layer of low refractive index totally reflects an incident light upon the lateral face to be confined within the substrate and transmitted in a side direction (backwards) efficiently. Since the increased amount of weight is roughly equal to the weight of the transparent layer of low refractive index, the liquid crystal display device is superior in the thin and lightweight structure. As a result, the liquid crystal cell is formed using the resin substrate as the cell substrate, whereby an incident light from the lighting device placed on the lateral face of the liquid crystal display panel can be efficiently transmitted via the substrate backwards. The optical path of the transmitted light is converted via the appropriate optical path converting means in the visible direction, whereby the screen is wholly bright and the good display quality with excellent uniformity of brightness can be accomplished. Also, the liquid crystal display device of the thin type with the lateral face arrangement of the lighting device can be formed.

As previously described, if the transparent layer of low refractive index does not exist, the transmitted light within the panel is incident upon the liquid crystal layer and the color filter layer usually adjacently disposed, the absorption component of light incident upon the polarizer is increased due to birefringence of the liquid crystal layer, or the backward transmission efficiency is remarkably decreased due to the light absorption with the color filter layer, whereby the screen is darker as being farther away from the lighting device, and the uniformity of luminance is significantly lost, resulting in unfavorable display.

Features and advantages of the invention will be evident from the following detailed description of the preferred embodiments described in conjunction with the attached drawings.

DETAILED DESCRIPTION OF THE PREFERRED EMBODIMENTS

Figure 1:
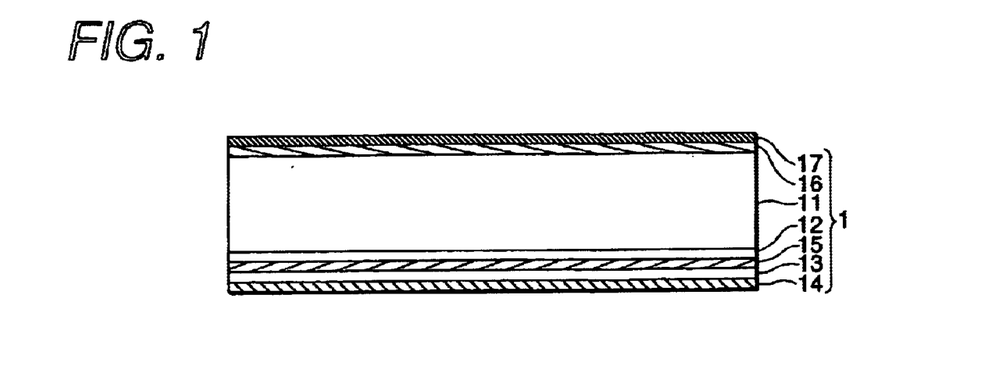
FIG. 1 is a cross-sectional view illustrating a resin substrate.

A resin substrate of the invention is a transparent resin plate having at least a conductive layer via a transparent layer with a lower refractive index than the resin plate. FIG. 1 illustrates an example of the resin substrate 1. Reference numeral 11 denotes the transparent resin plate; 12 denotes the transparent layer of low refractive index; 13 denotes the conductive layer; 14 denotes an oriented film; 15 denotes a color filter layer; 16 denotes a gas barrier layer; and 17 denotes a hard coat layer.

The transparent resin plate may be composed of one or more appropriate resins, but not limited specifically. In this connection, examples of resin may include acetate resin, polyester resin, polyether sulfone resin, polycarbonate resin, polyamide resin, polyimide resin, polyolefine resin, acrylic resin, polyether resin, polyvinyl chloride, styrene resin, norbornene resin, and other thermosetting or ultraviolet ray setting resins such as acrylic, urethane, acrylic urethane, epoxy, and silicone.

Particularly, the transparent resin plate used for a cell substrate is preferably excellent in the respects of the transparency and the mechanical strength rather than the transmittance of the illuminating light or display light, and the cell strength. Further, it is preferably superior in the optical isotropy in order to reduce the optical loss by suppressing the birefringence in the light transmission direction or the thickness direction as much as possible. Further, the transparent resin plate is preferably excellent in the thermal resistance such as heat stability, the chemical resistance, the gas barrier ability against oxygen or water content, and the surface smoothness. In the respect of the thermal resistance, the transparent resin plate is desirably made of resin having a glass transition temperature of 90° C. or higher, more preferably 100° C. or higher, or most preferably 120° C. or higher, such as epoxy resin, from the viewpoint of the heating temperature when forming the transparent layer of low refractive index, the conductive layer or the color filter layer.

The thickness of the transparent resin plate is not specifically limited, and may be appropriately selected depending on the strength for the purposes of use. For the cell substrate, the thickness may be typically 10 μm to 5 mm, preferably 50 μm to 2 mm, and more preferably 100 μm to 1 mm, from the respect of balancing the sealing strength of liquid crystal, the light transmission efficiency, and the thin type and light weight structure. Particularly when employed as the transmission substrate of an incident light from the lighting device, a greater cross section is more beneficial from the respects of the light incidence efficiency and transmission efficiency, and accordingly a greater thickness is more preferable.

On the other hand, a smaller thickness is more beneficial from the respect of the thin type and lightweight structure, as described before. Note that the transparent resin plate may be even in thickness, or may partially vary in thickness. When used as the transmission substrate, the transparent resin substrates having partially different thickness, for example, a wedge shape in cross section, may be favorable in the respect of increasing the incidence efficiency of transmitted light with an inclined arrangement of optical path converting means.

The transparent layer of low refractive index on one side or both sides of the transparent resin plate is provided as the layer having a lower refractive index than the transparent resin plate. Thereby, when an incident light from the lateral face via the lighting device 7 is transmitted into the transparent resin plate (or cell substrate) 11, its transmitted light is totally reflected due to a difference in refractive index between the resin plate 11 and the transparent layer 12, and confined within the transparent resin plate, so that the transmitted light is passed to the opposite lateral face (backward) efficiently, as shown as the polygonal line arrow α0' in FIG. 8.

When used as the cell substrate, the transparent layer of low refractive index prevents the transmission state from partially changing and prevents the transmitted light from decreasing or being less uniform because the transmitted light being incident on the liquid crystal layer is birefringent or scattered. Thereby, the transparent layer of low refractive index prevents the display from being darker or the display quality from degrading because the display near the lighting device is ghosting in the rear. Further, when the color filter is disposed, it is aimed at avoiding the reduction of the transmitted light by preventing the transmitted light from being abruptly absorbed. In the liquid crystal display device as taught in JP 5-158033, in which an incident light from the lighting device is transmitted through the liquid crystal layer, the transmitted light is scattered by the liquid crystal layer, resulting in the non-uniform transmission state, causing the non-uniform emergent light or ghost, the displayed image being difficult to see.

The transparent layer of low refractive index can be formed by suitable methods, including vacuum deposition or spin coating, employing an appropriate material with a lower refractive index than the transparent resin plate, such as an inorganic or organic dielectric with low refractive index. The materials or the forming methods are not specifically limited. When employed as the cell substrate, the transparent layer of low refractive index made of inorganic dielectric is preferable from the respect of stability in forming the electrodes.

A greater difference in refractive index between the transparent layer and the transparent resin plate is more beneficial from the respect of the backward transmission efficiency with an extended range of angles capable of total reflection. The difference in refractive index is 0.05 or more, preferably 0.1 or greater, and more preferably from 0.12 to 0.5. The difference in refractive index of the above value has less effect on the display quality in the reflection mode due to an external light, when the transparent resin plate is employed for the cell substrate. In this connection, when the difference in refractive index is equal to 0.1, the reflection factor of external light on its interface is 0.1% or less, resulting in extremely small decrease in brightness or contrast due to its reflection loss.

As illustrated in FIG. 1, the transparent layer 12 of low refractive index is arranged between the transparent resin plate 11 and the conductive layer 13, due to the confinement effect of the transmitted light and to prevent the intrusion into the liquid crystal layer, when employed as the cell substrate. Also, when the color filter layer 15 is disposed between the transparent resin plate 11 and the conductive layer 13, as illustrated in FIG. 1, it is preferably positioned closer to the resin plate 11 to prevent the absorption loss of the transmitted light with the color filter layer. Accordingly, usually, the transparent layer 12 of low refractive index is directly provided on the transparent resin plate 11. In this case, it is more beneficial to prevent scattering of the transmitted light as an affixed plane of the transparent layer on the transparent resin plate is smoother, and hence the transparent layer is smoother, and from the viewpoint of preventing influence on the display light when employed as the cell substrate.

The thickness of the transparent layer of low refractive index is favorably greater from the respect of maintaining the total reflection effect, because too thin layer may reduce the confinement effect due to the exudation phenomenon of wave motion. Its thickness may be appropriately determined in view of the total reflection effect, but typically may be quarter wavelength (about 100 nm) or greater, preferably half wavelength (190 nm) or greater, and more preferably one wavelength (380 nm) or greater on the basis of the optical path length calculated by refractive index ×layer thickness from the respect of the total reflection effect for a visible light having a wavelength from 380 nm to 780 nm, particularly a light having a wavelength of 380 nm on the shorter wavelength side. Further, it is preferably 600 nm or greater.

The conductive layer provided via the transparent layer of low refractive index on the transparent resin plate may be appropriately prepared according to the purposes of using the resin substrate, including the electrode for use in the cell substrate, the light reflection layer or electrode therefor, prevention of electrification, and shielding the electromagnetic wave. Accordingly, the conductive layer may be formed of a suitable material as conventionally employed for the transparent layer made of, for example, ITO (indium tin oxide), or an opaque layer of the light reflection type with the metallic thin film.

The resin substrate of the invention can be employed for a variety of purposes as conventionally pursued, and particularly can be utilized for the uses of entering the light from the lateral face and transmitting it backward, such as the cell substrate in the liquid crystal cell, because the backward transmission efficiency of the incident light on the lateral face as above described is excellent. For the actual utilization, one or more appropriate functional layers, including the color filter layer 15, the gas barrier layer 16 and the hard coat layer 17, can be provided at suitable locations as needed, as illustrated in FIG. 1.

The color filter layer 15 is provided for coloring the liquid crystal display, and usually interposed between the transparent layer of low refractive index 12 and the conductive film 13, as above described. Also, when employed as the liquid crystal cell substrate, an oriented film 14 composed of a rubbing film to orient the liquid crystal may be provided. The oriented film is usually formed on the conductive film 13 used as the electrode as illustrated. Note that when employed as the cell substrate, the gas barrier layer is usually provided outside the cell, and the hard coat layer is provided on the surface outside the cell, as illustrated.

Figure 2:
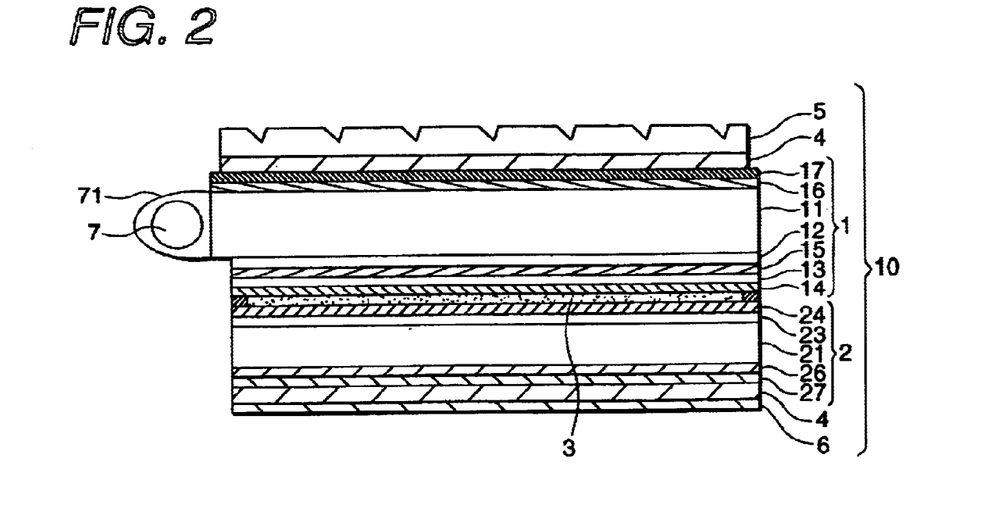
FIG. 2 is a cross-sectional view illustrating a liquid crystal display device.
Figure 3:
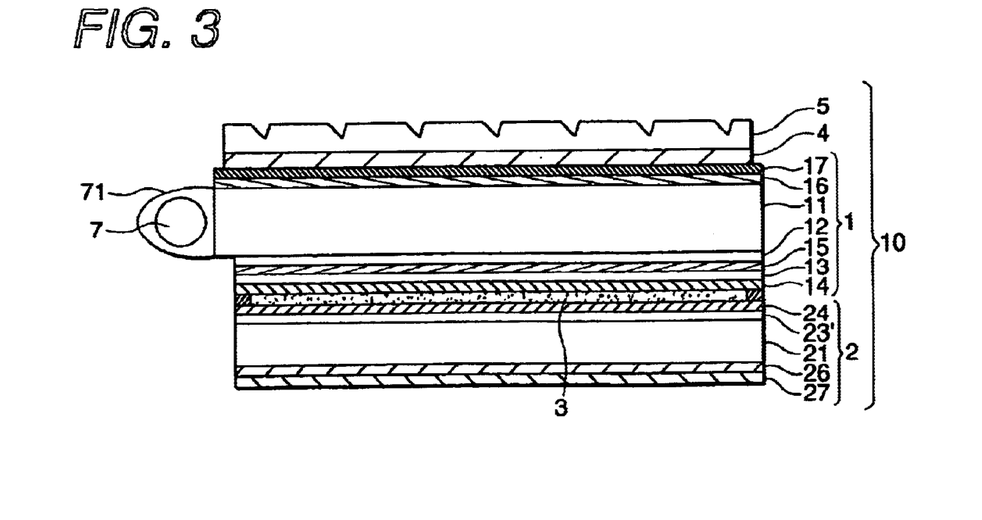
FIG. 3 is a cross-sectional view illustrating another liquid crystal display device.
Figure 4:
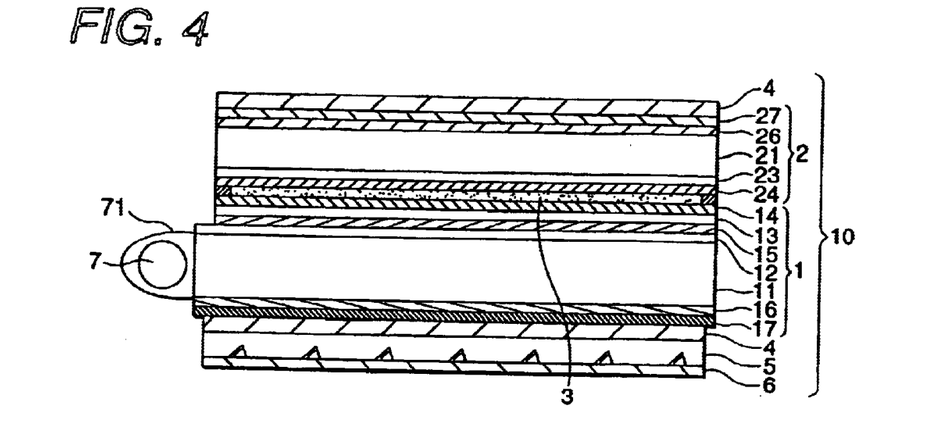
FIG. 4 is a cross-sectional view illustrating a further liquid crystal display device.

The liquid crystal display device of the invention has a liquid crystal display panel comprising at least a liquid crystal cell with a liquid crystal carried between a visible side substrate and a back side substrate that are disposed with electrodes on their substrates opposed to one another, wherein one or both of the visible side substrate and the back side substrate is or are the resin substrate with the transparent layer of low refractive index. Its example is shown in FIGS. 2, 3 and 4. Reference numeral 10 denotes the liquid crystal display panel; 1 denotes the visible side substrate composed of the resin substrate with the transparent layer of low refractive index; 2 denotes the cell substrate on the back side that is the opposite side; and 3 denotes the liquid crystal layer. Reference numeral 21 denotes the substrate; 23 denotes the electrode; 24 denotes the oriented film; 26 denotes the gas barrier layer; and 27 denotes the hard coat layer.

The liquid crystal display panel 10 is not specifically limited in its kind, except for the liquid crystal cell in which the resin substrate with the transparent layer of low refractive index is employed for at least one of the cell substrate, and can be appropriately used. In this connection, the specific examples of the liquid crystal display panel may include a twist type or a non-twist type, a guest host type, or a ferroelectric liquid crystal, and the types using the light diffusion, such as a TN type liquid crystal display panel, an STN type liquid crystal display panel, a vertical orientation type display panel, a HAN type display panel, and an OCB type display panel, on the basis of the orientation of the liquid crystal. The driving methods for the liquid crystal may be appropriately employed, such as an active matrix method or a passive matrix method, for example. Driving the liquid crystal can be usually made via the electrodes 13, 23 provided inside a pair of cell substrates 1, 2 as illustrated in FIG. 2.

In the case where the resin substrate of the invention is not employed on the visible side or back side substrate, the other substrate may be made of a suitable material such as glass or resin. From the viewpoint of light weight, both substrates on the visible side and the back side maybe preferably made of resin. Also, the other substrate is necessary to be transparent when the illuminating light or display light needs to be transmitted, whereas it may be opaque, if there is no need of transmitting the light such as the reflection type liquid crystal cell in which the electrode serving as the reflection layer is provided within the cell.

In this connection, the liquid crystal display panel as illustrated in FIG. 2 has both substrates 11, 21 on the visible side and the back side, and both electrodes 13, 23 provided inside them, consisting of the transmission type liquid crystal cell composed of the transparent layer, and is a front light transmission/reflection type with the reflection layer 6 disposed on the back side of the liquid crystal cell employing the resin substrate 1 of the invention on the visible side substrate. Also, the liquid crystal display panel as illustrated in FIG. 3 has the electrode 23' provided inside the back side substrate consisting of the reflection type liquid crystal cell made of a metal thin film serving as the light reflection layer, and is the front light transmission/reflection type.

Accordingly, in the case of the liquid crystal display panel of transmission/reflection type as illustrated in FIG. 3, the transparent substrate 21 is employed for the back side substrate as illustrated, but because of no need of transmitting the light, the substrate maybe opaque as previously described. Also, when the substrate with the gas shield and abrasion resistance properties is employed, the gas barrier layer 26 or the hard coat layer 27 as illustrated may be omitted to make the display panel thinner.

On the other hand, in a liquid crystal display panel as illustrated in FIG. 4, both substrates 21, 11 on the visible side and the back side, and both electrodes 23, 13 provided inside them are composed of a liquid crystal cell of transmission type made up of a transparent layer, and the resin substrate 1 according to the invention is employed for the substrate on the back side. In this illustrated example, the reflection layer 6 is disposed on the back side of the liquid crystal cell, whereby the liquid crystal display panel of the transmission/reflection type with the back-light is provided, but the liquid crystal display panel of the transmission type may be provided without the reflection layer.

In forming the liquid crystal display device, one or more appropriate optical layers such as the polarizer, phase retarder, light diffusion layer or optical path converting means may be provided on one side or both sides of the liquid crystal cell, as needed, and a lighting device may be provided on one or more lateral faces of the liquid crystal display panel. Further, a color filter layer may be provided on the cell substrate other than the resin substrate according to the invention. In this case, the color filter layer is usually provided between the substrate and the electrode on the cell substrate. Also, the color filter layer is typically provided on the visible side substrate, but not limited thereto. In the illustrated example, reference numeral 4 denotes the polarizer, reference numeral 5 denotes the optical path converting means, and reference numeral 7 denotes the lighting device.

The polarizer is aimed at producing the display employing the linear polarization, and the phase retarder is aimed at improving the quality of display by compensating for a retardation owing to birefringence of the liquid crystal. Also, the light diffusion layer is aimed at effecting homogeneous luminance owing to the enlargement of display area with the diffusion of display light or leveling the bright streak emission via the optical path converting means, and increasing the quantity of incident light onto the optical path converting means owing to diffusion of the transmitted light within the liquid crystal display panel. On the other hand, the optical path converting means is aimed at regulating the optical path of an incident light from the lighting device placed on the lateral face of the liquid crystal display panel, or a transmitted light within the panel to convert the optical path in a thickness direction of the liquid crystal display panel to be useful as the display light.

The polarizer may be suitably employed, but particularly is not limited. From the viewpoint of obtaining the display with excellent contrast ratio by making a highly linear polarization incident, the polarizer preferably uses highly polarized films such as absorption type polarized films or films with a transparent protective layer on one side or either side, composed of a dichroic material such as iodine or dichroic dye adsorbed to a hydrophilic polymeric material such as polyvinyl alcohol based film, or partial formal polyvinyl alcohol based film, or ethylene/vinyl acetate copolymer based, partially saponified film.

The transparent protective layer is preferably made of a material that is excellent in the respects of transparency, mechanical strength, thermal stability, and moisture shield properties. In this connection, examples of the material may include resins illustrated with the transparent resin plate. The transparent protective layer may be attached by bonding the film, or applying the resin liquid.

The polarizer for use, particularly the polarizer on the visible side, may be subjected to the non-glare treatment or anti-reflection treatment in order to prevent lower visibility due to surface reflection of the external light. The non-glare treatment can be applied by making the surface a refined prismatic structure by various methods including a surface roughing method such as the sandblasting or embossing finish, and a blending method of the transparent grains of silica. The anti-reflection process can be made by forming a deposited film with coherency. Also, the non-glare treatment or anti-reflection treatment may be effected by bonding a film with the refined prismatic surface structure or with coherency. The polarizer may be provided on either side of the liquid crystal cell, as illustrated in FIGS. 2 and 4, or only on one side of the liquid crystal cell, as illustrated in FIG. 3.

On the otherhand, the phase retarder may be a birefringent film that is obtained by uniaxially or biaxially drawing a film made of appropriate resin as illustrated with the transparent resin plate, an oriented film of appropriate liquid crystal polymer, nematic or discotic, or its oriented layer which is supported by the transparent substrate. It may be a film having the refractive index regulated in a thickness direction under the action of heat shrinkage force of a thermally shrinkable film. The phase retarder for compensation is usually disposed between the polarizer on the visible side or/and on the back side and the liquid crystal cell, as needed, and maybe suitably used depending on the region of wavelength. Also, the phase retarder may be composed of two or more layers in superposition in order to control the optical characteristics such as the retardation.

Also, the light diffusion layer can be provided by suitable methods with a coated layer or a diffusion sheet having the refined prismatic surface structure that is consistent with the non-glare layer. The light diffusion layer can be formed as the layer also serving as bonding the optical layer such as the polarizer or the phase retarder as the adhesive layer with transparent grains, achieving the thin structure. The adhesive layer is formed using adhesives having suitably a base polymer such as rubber, acrylic, vinyl alkyl ether, silicone, polyester, polyurethane, polyether, polyamide, or styrene.

By the way, the adhesives superior in the respects of transparency, weather proofing, and thermal resistance, are preferably employed, such as acrylic adhesives with the base polymer having alkyl ester of acrylic acid or methacrylic acid as a main component. The transparent grains to be blended into the adhesive layer may be one or more sorts of inorganic grains that may be conductive, and made of, for example, silica, alumina, titania, zirconia, tin oxide, indium oxide, cadmium oxide, or antimony oxide, with an average diameter of 0.5 to 20 $\mu$m, or organic grains made of bridged or unbridged polymer.

Figure 8:
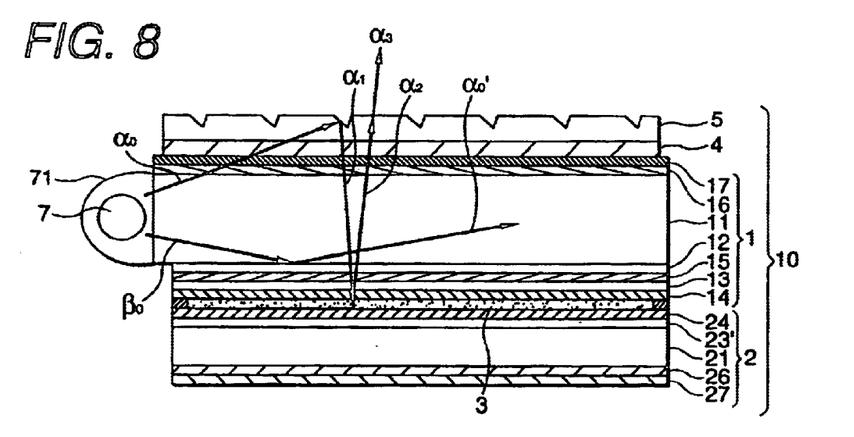
FIG. 8 is an explanatory view of an optical path in an example.

The optical path converting means is aimed at reflecting an incident light or its transmitted light from the lighting device 7 disposed on the lateral face of the liquid crystal display panel 10, as indicated by the polygonal line arrows $\alpha 0$, $\alpha 1$ in FIG. 8, and converting the optical path in a thickness direction of the panel to be useful as the illuminating light (display light) Hence, it is disposed outside one of the visible side substrate or back side substrate in the liquid crystal display panel 10 as illustrated in FIGS. 2 to 4, thereby forming a front light or a back light.

The optical path converting means 5 may be in a suitable form of reflecting an incident light from the lighting device 7, and converting the optical path in a predetermined direction as illustrated in the figure. From the standpoint of obtaining a display light excellent in the directivity to the front direction via the optical path conversion, optical path converting means preferably comprises an optical path converting bevel opposed to the lateral face with the lighting device, that is, the incidence lateral face, particularly an optical path converting bevel with prismatic structures of substantial triangle or pentagon in cross section.

The optical path converting bevel that is preferable from the viewpoint of directivity to the front direction has an inclination to the plane of liquid crystal display panel being 35 to 48 degrees, preferably 38 to 45 degrees, and more preferably 40 to 44 degrees. Also, the optical path converting means has preferably a repetition structure of the optical path converting bevel from the respect of thin form. Further, the optical path converting bevel may be formed in a projection (convex) form, but is favorably formed in a groove (convex) form in order to maintain the function of bevel to improve the abrasion resistance, because the bevel is less prone to hurt. In the case where two or more incidence lateral faces are provided by disposing the lighting devices on two or more lateral faces of the liquid crystal display panel, the optical path converting means preferably comprises the optical path converting bevels corresponding to the number and position of incidence lateral faces, such as a two-face optical path converting bevel with an equilateral triangle in cross section.

In the liquid crystal display device of transmission/reflection type as illustrated in FIGS. 2 to 4, it may be necessary in some cases to see a display light α3 via the optical path converting means layer 5 as indicated by the polygonal line arrow α2 in FIG. 8, in which case from the viewpoint of good visibility of the display light, it is preferable to have optical path converting means of a structure having a gentle bevel or a flat face between the optical path converting bevels as illustrated in the figure. Accordingly, when the optical path converting means has a structure of prismatic structures triangular in cross section disposed repeatedly and adjacently comprising the optical path converting bevels and the gentle bevel, the inclination to the panel plane of the gentle bevel is preferably 10 degrees or less, more preferably 5 degrees or less, and most preferably 3 degrees or less. A difference in inclination between gentle bevels adjacently placed is preferably within one degree, and more preferably as small as 0.3 degree or less.

The optical path converting means of a structure having the optical path converting bevel can reflect an incident light or its transmitted light from the lateral face via the optical path converting bevel, convert the optical path with excellent directivity in the front direction and easily balance the brightness in a state favorable for both transmission and reflection modes. However, in the case of a scattering reflection method via the rough surface, as disclosed in JP 5-158033, the light usable for the display is the light significantly slanted from the front direction getting out of the total reflection condition due to scattering and emerging from the panel, being less favorable to utilize it for the display, in which the display in the front direction is darker. If the scattering with the rough surface reflector is stronger, the quantity of light in the front direction in the reflection mode is reduced, and unfavorable for the display. Accordingly, in this rough surface scattering reflection method, the brightness in both transmission and reflection modes is difficult to balance.

The optical path converting means maybe made of a suitable material indicating the transparency in accordance with the wavelength region of the lighting device. In this connection, in a visible light region, the resins or glasses listed in the transparent resin plate can be employed. The optical path converting means is preferably made of a material indicating no or less birefringence. From the viewpoint of suppressing the quantity of light loss that is confined within the panel due to reflection at the interface and can not emerge and supplying efficiently an incident light on the lateral face or its transmitted light to the optical path converting bevel of the optical path converting means, the optical path converting means desirably has a refractive index higher than the transparent layer of low refractive index in the resin substrate, which is preferably 0.05 or more, and more preferably 0.1 or more.

The optical path converting means can be formed by a cutting method or other suitable methods. The preferable manufacturing methods from the standpoint of mass productivity include a transfer method of transferring a shape by pressing the thermoplastic resin onto a mould capable of forming a predetermined shape under heating, a filling method of filling a thermoplastic resin molten by heating or a resin fluidized by heating or solvent into a mould capable of forming a predetermined shape, and a polymerization method of polymerizing a liquid resin polymerizable with the heat, ultraviolet rays or radiant rays by filling or flowing it into a mould capable of forming a predetermined shape. Accordingly, the optical path converting means may be formed by attaching its predetermined conformation directly on the cell substrate, or formed as a transparent sheet with the predetermined conformation. The thickness of the optical path converting means may be determined suitably, but typically 30 μm or less from the respect of thin structure, preferably 5 to 20 μm, and more preferably 10 to 100 μm.

The optical path converting means is preferably disposed with the face having the optical path converting means formed outward, as illustrated in FIGS. 2 to 4, from the standpoints of the higher reflection efficiency via the optical path converting bevel, or the increased luminance by making effective use of the incident light on the lateral face. In the case where the optical path converting means is formed independently as the transparent sheet as above described, the transparent sheet is preferably bonded to the liquid crystal display panel via an adhesive layer having a higher refractive index than the transparent layer of low refractive index in the resin substrate, particularly an adhesive layer of refractive index as equivalent as possible to that of the transparent sheet, from the above-mentioned respects.

Accordingly, the refractive index of the adhesive layer maybe consistent with that of the optical path converting means. The adhesive layer can be formed by suitable transparent adhesives, the sort of adhesives being specifically not limited. From the respect of simplifying the bonding operation, the bonding method with the adhesive layer is preferred. The adhesive layer may be consistent as above described, and may be of the light diffusion type.

The lighting device placed on the lateral face of the liquid crystal display panel is aimed at making a light for use as the illuminating light of the liquid crystal display device incident upon the lateral face of the liquid crystal display panel. Thereby, the liquid crystal display device can be made a thin and lightweight structure by a combination with the optical path converting means placed on the panel. In this connection, in the liquid crystal display panel, as illustrated in FIGS. 2 to 4, there is a difference in the thickness between the optical path converting means 5 and a side-light light conducting plate 83 which directly leads to a difference in the thickness of the liquid crystal display device, as will be clear from the contract with the liquid crystal display panel of transmission/reflection type using the side-light type conducting plate 83 as illustrated in FIGS. 5 to 7. In FIGS. 5 to 7, reference numeral 25 denotes a color filter layer, reference numeral 8 denotes a lighting device, reference numeral 81 denotes a light source, reference numeral 82 denotes a holder, and other reference numerals denote the same parts as in FIGS. 2 to 4.

From the viewpoint of the backward transmission efficiency of an incident light from the lighting device, the preferred position of the lighting device is on a lateral face of the cell substrate on the side where the optical path converting means is provided, in the resin substrate 1 according to the invention as illustrated in FIGS. 2 to 4. In this case, in order to prevent an incident light from the lighting device entering the liquid crystal layer, a preferred method of disposing the lighting device involves extending the lateral face of the cell substrate 1 where the lighting device is disposed from the lateral face formed by another cell substrate 2. Accordingly, the substrates on the visible side and the back side may be different in the size of plane, and are not required to be equal. As above described, the thickness of the substrates on the visible side and the back side may be different, and are not required to be equal.

As previously described, when an incident light α0 on the lateral face from the lighting device 7 is transmitted inside the transparent resin plate 11 via the transparent layer 12 of low refractive index provided on the resin substrate 1 as indicated by the polygonal line arrows β0, α0' in FIG. 8, the transmitted light is totally reflected owing to a difference in refractive index between the resin plate 11 and the transparent layer 12, and efficiently confined within the transparent resin plate to thereby transmit efficiently the transmitted light α0' to the opposite lateral face (backward) and to supply uniformly the transmitted light to the optical path converting bevel of the optical path converting means 5 at a remote position from the lighting device, converting the optical path as indicated by the polygonal line arrows α1, α2, α3 via the reflection from the bevel, thereby improving the uniformity of brightness over the display screen.

Consequently, an incident light from the lighting device or its transmitted light is transmitted efficiently backwards, converting the optical path of the transmitted light efficiently in a visible direction of the liquid crystal display panel via the optical path converting means to be utilized for the liquid crystal display. A front light mechanism or back light mechanism can be formed by the lateral arrangement of the lighting device and the optical path converting means that is quite thin, and is superior in the respect of the thin and lightweight structure. Hence, the liquid crystal display device of transmission type or transmission/reflection type that is excellent in the thin and lightweight structure, brightness, and the display quality can be formed.

Figure 9:
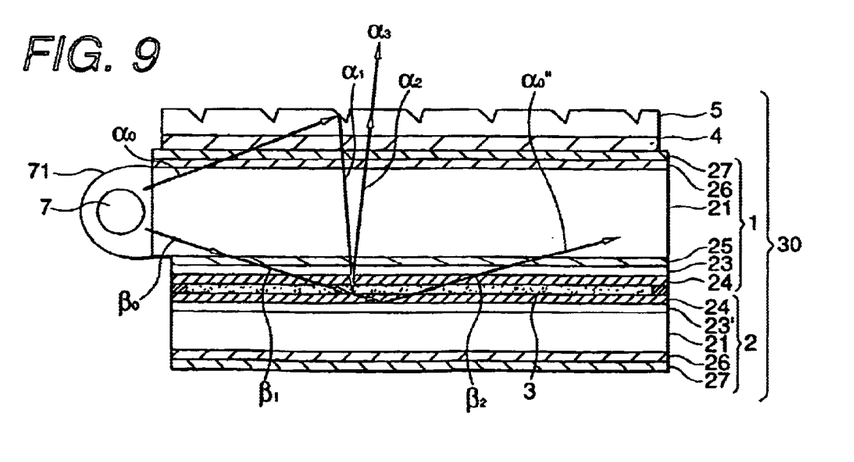
FIG. 9 is an explanatory view of an optical path in the conventional example.

In the case where the cell substrate with the lighting device has no transparent layer of low refractive index, when an incident light β0 on the lateral face from the lighting device 7 is transmitted inside the substrate 21 as indicated by the polygonal line arrows β, β1, β2, α0' in FIG. 9, the transmitted light is incident upon the color filter layer 25 or the liquid crystal layer 3, and a reflected light β2 via the reflection layer electrode 23' is retransmitted through the liquid crystal layer 3 or the color filter layer 25. Consequently, a light α0" transmitted backwards as above described is significantly reduced, the brightness being decreased as being farther away from the lighting device, resulting in great variations in the luminance over the display screen.

The suitable lighting devices may be employed, including a filamentary light source such as (cold, hot) cathode ray tubes, a point light source such as a light emitting diode, an array where point light sources are arranged linearly or in a plane, and a combination of the point light source and the filamentary light conducting plate in which an incident light from the point light source is converted via the filamentary light conducting plate into the filamentary light source. The lighting device can be disposed on one or more lateral faces in the liquid crystal display panel. In the case where the lighting device is disposed on two or more lateral faces, plural lateral faces may be a combination of opposed lateral faces, a combination of lateral faces crossed longitudinally or transversely, or a combination of three or more lateral faces employing the opposed and crossed lateral faces.

The lighting device enables the visibility in a lighting mode. In a reflection mode with the external light, the liquid crystal display device of transmission/reflection type can switch the lighting on or off, because there is no need of lighting. The switching method may be arbitrary, or any of the conventional methods. Note that the lighting device may be heterochromatic illumination capable of changing the luminescent color, or emit a heterochromatic light via another kind of lighting device.

As illustrated in the figure, the lighting device 7 may be a combination with suitable auxiliary means such as a light source holder 71 surrounding it to lead a divergent light to the lateral face of the liquid crystal display panel, as needed. The light source holder is a suitable reflection sheet for reflecting at least the light from the lighting device, such as a resin sheet, a white sheet or a metal foil attached with a metal thin film of high reflection ratio, for example. The light source holder may be utilized as holding means also serving to enclose the lighting device by a method of bonding its end portion to the edge portions of the upper and lower faces of the cell substrate in the liquid crystal display panel.

As illustrated in FIGS. 2 and 4, the liquid crystal display device has the light reflection layer 6 disposed at an appropriate position, as needed. This light reflection layer is aimed at reversing the reflection of the front light in the example of FIG. 2, and aimed at improving the light utilization efficiency by reversely reflecting a leakage light from the optical path converting means to be incident upon it, or reflecting a light from the liquid crystal cell to form the liquid crystal display device of transmission/reflection type in the example of FIG. 4. The light reflection layer may be formed of appropriate means such as a white sheet as conventionally made.

By the way, a coated layer containing the powder of a metal with high reflection ratio, for example, aluminum, silver, gold, copper, or chromium, or an alloy thereof, in a binder resin, a metallic thin film layer with the metal or a dielectric multi-layer film by suitable thin film formation methods, including a vacuum deposition method and a sputtering method, a reflective sheet having the coated layer or the attached layer supported by a substrate made of a film, and a light reflection layer of high reflection ratio composed of a metal foil are preferable, particularly in the case where the liquid crystal display device of transmission/reflection type is formed. In this connection, the light reflection layer 6b is composed of a metallic thin film on the transparent supporting substrate 6a and bonded to the optical path converting means via an adhesive layer 6c of lower refractive index than the optical path converting means 4 in order to improve the light utilization efficiency in the example of FIG. 2.

This light reflection layer may exhibit a light diffusion function. By diffusing a reflected light on the diffusion reflection face, the directivity to the front direction can be improved. Also, in a case of the roughened surface, the visibility can be improved by preventing Newton rings from arising due to intimate contact. Accordingly, the light reflection layer may be simply laid outside the optical path converting means, or closely placed by a bonding or deposition method. In the case where the light reflection layer is closely disposed on the bevel of the optical path converting means, the leakage light can be prevented substantially completely due to an improved reflection effect, thereby improving the characteristic of visual angle or the luminance.

The reflection layer of light diffusion type may be formed in such a manner that a film substrate with the surface of refined prismatic structure made by a suitable method of roughening the surface by sand blasting or mat finish, or adding grains is provided with the light reflection layer with the refined prismatic structure reflected. The light reflection layer of the refined prismatic structure with the fine prismatic structures on the surface can be made by attaching a metal onto the surface of the film substrate, by suitable methods including the deposition methods such as vacuum deposition, ion plating, and sputtering, and the plating method.

With the liquid crystal display device as described above, almost an incident light upon the incidence lateral face is reflected via the liquid crystal display panel, particularly the cell substrate, in accordance with a law of refraction, and transmitted backwards, while preventing emergence (leakage) from the panel surface. Thereby, a light incident on the optical path converting bevel of the optical path converting means has its optical path converted in a visible direction efficiently and with good vertical directivity. The other transmitted light is totally reflected and further transmitted backwards to enter the optical path conversion bevel located in the rear, and has its optical path converted in the visible direction efficiently and with good vertical directivity, whereby the display with uniform brightness all over the panel display plane can be accomplished. Accordingly, the liquid crystal display device of transmission type or transmission/reflection type that is bright, easy to see, and superior in the display quality can be formed, making use of the light from the lighting device efficiently.

In this invention, the optical elements or parts such as optical path converting means, liquid crystal cell, polarizer, and phase retarder for forming the liquid crystal display device as described above may be laminated totally or partially and bonded, or arranged to be easily separable. From the viewpoint of preventing the lower contrast by suppressing the reflection at the interface, the bonded state is preferable.

Suitable transparent adhesives such as pressure sensitive adhesive may be used for the bonding process. The transparent adhesive layer may exhibit a diffusion function by containing transparent grains therein. The optical members, particularly those on the visible side can have ultraviolet ray absorbency by a treatment with the ultraviolet ray absorbent agent such as salicylic acid esther compounds, benzophenone compounds, benzotriazole compounds, cyanoacrylate compounds, or nickel complex salt compounds.

REFERENCE EXAMPLE 1

Ultraviolet ray setting acrylic resin was dripped and filled by a syringe into a mould having a predetermined shape worked beforehand, on which a polycarbonate film having a thickness of 60 μm was laid and brought into intimate contact by a rubber roller to remove excess resin and bubbles. Ultraviolet ray was applied from a metal halide lamp for the setting treatment. Then, the acrylic resin was exfoliated from the mould, cut in a predetermined size, and peeled off the polycarbonate film to produce an optical path converting means sheet with a refractive index of 1.51. An adhesive layer with a refractive index of 1.51 was applied on a face without the optical path converting means to produce a transparent sheet. This transparent sheet had a width of 40 mm and a length of 30 MM, with prismatic concave portions having a ridge line extending over the cross direction, and inclined at an angle of 21 degrees being provided consecutively at a pitch of 210 μm, the inclination on the optical path converting bevel being about 42 degrees, and the apex angle with the steep bevel being 70 degrees, the projection width of the optical path converting bevel onto the reference plane being 10 to 16 μm, and the area of a flat portion being 10 times or more the total projection area for the optical path conversion bevel and the reference plane of the steep bevel.

REFERENCE EXAMPLE 2

Employing a different mould, a transparent sheet with an adhesive layer composed of optical path converting means itself was obtained in the same way as in the reference example 1. This transparent sheet had a width of 40 mm and a length of 30 mm, with prismatic concave portions having a ridge line extending over the cross direction, and inclined at an angle of 21 degrees being provided consecutively at a pitch of 210 μm, the inclination on the optical path converting bevel being about 42 degrees, and the apex angle with the steep incline face being 70 degrees, the projection width of the optical path converting bevel onto the reference plane being 13 to 17 μm, and the area of a flat portion being 10 times or more the total projection area for the optical path conversion bevel and the reference plane of the steep bevel.

EXAMPLE 1

Alicyclic epoxy resin was injected into a specularly treated mould and cured by heating. A transparent resin plate thus obtained having a thickness of 0.7 Mm, a refractive index of 1.504 and a glass-transition temperature of 120° C. was treated in plasma in the argon atmosphere. Magnesium fluoride was deposited in vacuum by electron beam heating on one side to form the transparent layer of low refractive index having a thickness of 600 Nm and a refractive index as low as 1.38, on which are formed the stripe-like color filter layers of red, blue and green, and an ITO transparent conducting layer (electrode) by sputtering in succession. As a result, a resin substrate was obtained.

EXAMPLE 2

A resin substrate was produced in the same manner as in the example 1, except that the transparent layer of low refractive index made of magnesium fluoride was 300 Nm thick.

EXAMPLE 3

A resin substrate was produced in the same manner as in the example 1, except that the transparent layer of low refractive index made of magnesium fluoride was 100 nm thick.

EXAMPLE 4

A resin substrate was produced in the same manner as in the example 1, except that the transparent layer of low refractive index was made of silicon dioxide, instead of magnesium fluoride, and had a refractive index of 1.46.

REFERENCE EXAMPLE 3

A resin substrate was produced in the same manner as in the example 1, except that the transparent layer of low refractive index made of magnesium fluoride was not provided.

REFERENCE EXAMPLE 4

A resin substrate was produced in the same manner as in the example 1, except that the transparent layer of low refractive index and the color filter layer were not provided.

EXAMPLE 5

Polyvinyl alcohol solution was spin coated onto the transparent electrodes on the visible side substrate composed of the resin substrate in the example 1 and the back side substrate composed of the resin substrate in the reference example 4 its dry film was subjected to the rubbing treatment. Then a gap adjusting member composed of spherical glass beads was disposed so that its rubbing faces were opposed in the rubbing directions orthogonal, and sealed with a seal member. A liquid crystal (made by Merk, ZLI-4792) was injected to form a TN-type liquid crystal cell. A polarizer (made by Nitto Denko, NPF EGW1145DU) subjected to an anti-reflection treatment and a non-glare treatment was pasted on its visible side, and a reflection-type polarizer (made by Nitto Denko, NPF EG3228GR) pasted on the back side to produce a normally white reflection-type liquid crystal display panel. The size of the panel was 45 Mm wide and 34 mm long, one side of the visible side substrate in its longitudinal direction protruding from the back side substrate by 2 mm. The transparent electrode on the back side substrate was divided into two by etching before the rubbing treatment.

A cold cathode ray tube was disposed on a protruding lateral face of the visible side substrate for the panel, and surrounded by a polyester film with silver deposited, the ends of the film being bonded to the upper and lower faces of the substrate by a pressure sensitive adhesive double coated tape to protect and secure the cold cathode ray tube. Also, a transparent sheet obtained in the reference example 1 was bonded via its adhesive layer on an upper face on the visible side of the panel to place the optical path converting means, and to produce a liquid crystal display device of the transmission/reflection type.

EXAMPLE 6

A liquid crystal display device of the transmission/reflection type was obtained in the same manner as in the example 5, except that the resin substrate of the example 2 was used for the visible side substrate, instead of the resin substrate of the example 1.

EXAMPLE 7

A liquid crystal display device of the transmission/reflection type was obtained in the same manner as in the example 5, except that the resin substrate of the example 3 was used for the visible side substrate, instead of the resin substrate of the example 1.

EXAMPLE 8

A liquid crystal display device of the transmission/reflection type was obtained in the same manner as in the example 5, except that the resin substrate of the example 4 was used for the visible side substrate, instead of the resin substrate of the example 1.

COMPARATIVE EXAMPLE 1

A liquid crystal display device of the transmission/reflection type was obtained in the same manner as in the example 5, except that the resin substrate of the reference example 3 was used for the visible side substrate, instead of the resin substrate of the example 1.

EXAMPLE 9

A TN-type liquid crystal cell was formed in the same manner as in the example 5, except that the resin substrate of the reference example 4 was used for the visible side substrate, and the resin substrate of the example 1 was used for the back side substrate. Apolarizer (NPF EGW1145DU) was pasted on either side to produce a normally white liquid crystal display panel of the transmission type. On the panel, one side of the back side substrate was protruded from the visible side substrate by 2 mm. A transparent electrode on the visible side substrate was divided into two by etching. Then, a cold cathode ray tube was disposed on a protruding lateral face of the back side substrate for the pane 1, and surrounded by a polyester film with silver deposited, the ends of the film being bonded to the upper and lower faces of the substrate by a pressure sensitive adhesive double coated tape to protect and secure the cold cathode ray tube. Also, the transparent sheet obtained in the reference example 2 was bonded via its adhesive layer on a lower face on the back side of the panel to place the optical path converting means, and to produce a liquid crystal display device of the transmission type.

COMPARATIVE EXAMPLE 2

A liquid crystal display device of the transmission type was obtained in the same manner as in the example 9, except that the resin substrate of the reference example 3 was used for the back side substrate, instead of the resin substrate of the example 1.

Evaluation test

For the liquid crystal display devices produced in the examples and the comparative examples, a cold cathode ray tube was lighted in a dark room in a state of applying no voltage to the liquid crystal cell, and the front luminance was measured at a position 5 mm off the incidence lateral face and 5 mm off the central part and opposite ends in a lighting mode, employing a luminance meter (made by Topcon, BM7) under the condition with a visual field of 1 degree. For the liquid crystal display devices of the transmission/reflection type produced in the examples 5 to 8 and the comparative example 1, the front luminance was measure at the central part in an external light mode with a ring-like lighting device placed at an azimuth of 20 degrees without lighting the cold cathode ray tube in a dark room.

The results are listed in the following table.

| | Front luminance (cd/m$^2$) | | | |
| --- | --- | --- | --- | --- |
| | Lighting mode | | | External light mode |
| | Incidence Lateral face part | Central part | Opposed ends | Central part |
| Example 5 | 65 | 70 | 68 | 132 |
| Example 6 | 61 | 54 | 50 | 128 |
| Example 7 | 53 | 44 | 38 | 130 |
| Example 8 | 58 | 50 | 46 | 138 |
| Comparative example 1 | 48 | 25 | 14 | 132 |
| Example 9 | 326 | 357 | 388 | — |
| Comparative example 2 | 248 | 134 | 60 | — |

From the table, it can be found that the front luminance is high and has small variations in the examples in the lighting mode, while it is low and has large variations in the comparative examples. Also, in the examples 5 to 8, it can be found that the characteristics in the incidence lateral face part are more improved to make the brightness more uniform, as the transparent layer of low refractive index is thicker, and the brightness is more excellent with a larger difference in the refractive index between the substrate and it. Further, in the reflection mode, it can be found that owing to a small difference from the comparative examples, there is an insignificant influence on the reflection mode with the addition of the transparent layer of low refractive index.

On one hand, one-half the screen was observed in a display state by applying a voltage to the liquid crystal cell. In the lighting mode of the examples 5 to 9 and in the reflection mode of the examples 5 to 8, there was an excellent display without particular problem. However, in the lighting mode of the comparative examples, the display was very hard to observe owing to darkness and large variations. With the above, in this invention, the use of the resin substrate with the transparent layer of low refractive index can prevent the absorption with the color filter, forming a liquid crystal display device of the transmission type or transmission/reflection type with a uniform luminance distribution. Thus, it will be found that a combination of the optical path converting means and the lateral face arrangement of the lighting device can attain the thin and light weight structure, while avoiding the greater sublimity and heavier weight due to the use of light conducting plate, making it possible to form a liquid crystal display device with excellent display quality.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A cell substrate for a liquid crystal display panel comprising:
   a transparent resin plate;
   a conductive layer provided on said transparent resin plate; and
   a transparent layer, which has a lower refractive index than said transparent resin plate, interposed between said transparent resin plate and said conductive layer, wherein the transparent layer has a thickness of more than 380 nm.

2. The cell substrate according to claim 1, wherein an optical path length, which is a product of a thickness of said transparent layer with lower refractive index and the refractive index of said transparent layer with lower refractive index, is 100 nm or greater.

3. The cell substrate according to claim 1, wherein said transparent layer with lower refractive index is composed of an inorganic dielectric.

4. The cell substrate according to claim 1, wherein said conductive layer is transparent.

5. The cell substrate according to claim 1, wherein said transparent resin plate is composed of resin having a glass transition temperature of 90° C. or more.

6. The cell substrate according to claim 1, further comprising a color filter layer between said transparent layer with lower refractive index and said conductive layer.

7. A liquid crystal display device having a liquid crystal display panel comprising at least a liquid crystal cell with a liquid crystal carried between a visible side substrate and a back side substrate that are disposed with electrodes on their substrates opposed to one another, wherein at least one of said visible side substrate and said back side substrate is the cell substrate according to claim 1.

8. The liquid crystal display device according to claim 7, wherein said liquid crystal display panel has a polarizer on one side or both sides of said liquid crystal cell.

9. The liquid crystal display device according to claim 7, further comprising optical path converting means, for converting the optical path of an illuminating light from said lighting device that is incident through one of the substrates by reflecting the light toward the other substrate, provided outside of the visible side substrate or the back side substrate.

* * * * *